United States Patent [19]

Yannone et al.

[11] 4,103,178

[45] Jul. 25, 1978

[54] BLACK START SYSTEM FOR LARGE STEAM POWERED ELECTRIC GENERATION PLANTS

[75] Inventors: Robert A. Yannone, Aldan; John F. Reuther, Penn Hills Township, Allegheny County, both of Pa.

[73] Assignee: Westinghouse Electric Corp., Pittsburgh, Pa.

[21] Appl. No.: 776,688

[22] Filed: Mar. 11, 1977

[51] Int. Cl.² ............................................. F02N 11/06
[52] U.S. Cl. .............................. 290/40 R; 60/39.18 B
[58] Field of Search ................. 60/39.18 B, 39.28 R; 290/2, 40 R, 40 C, 40 D

[56] References Cited

U.S. PATENT DOCUMENTS

| | | | |
|---|---|---|---|
| 3,959,635 | 4/1976 | Tanco | 290/40 R |
| 4,010,605 | 3/1977 | Uram | 60/39.18 B |
| 4,032,793 | 6/1977 | Uram | 290/2 |

*Primary Examiner*—James R. Scott
*Assistant Examiner*—M. K. Mutter
*Attorney, Agent, or Firm*—E. F. Possessky

[57] ABSTRACT

A black start generating system for a steam plant comprises a gas turbine-generator and a control system which operates the turbine in a modified dead load mode to accept successive load steps in accordance with a black plant startup sequence. In the dead load mode, certain limits are placed on control operations to protect the turbine while permitting load stepping during plant startup.

7 Claims, 9 Drawing Figures

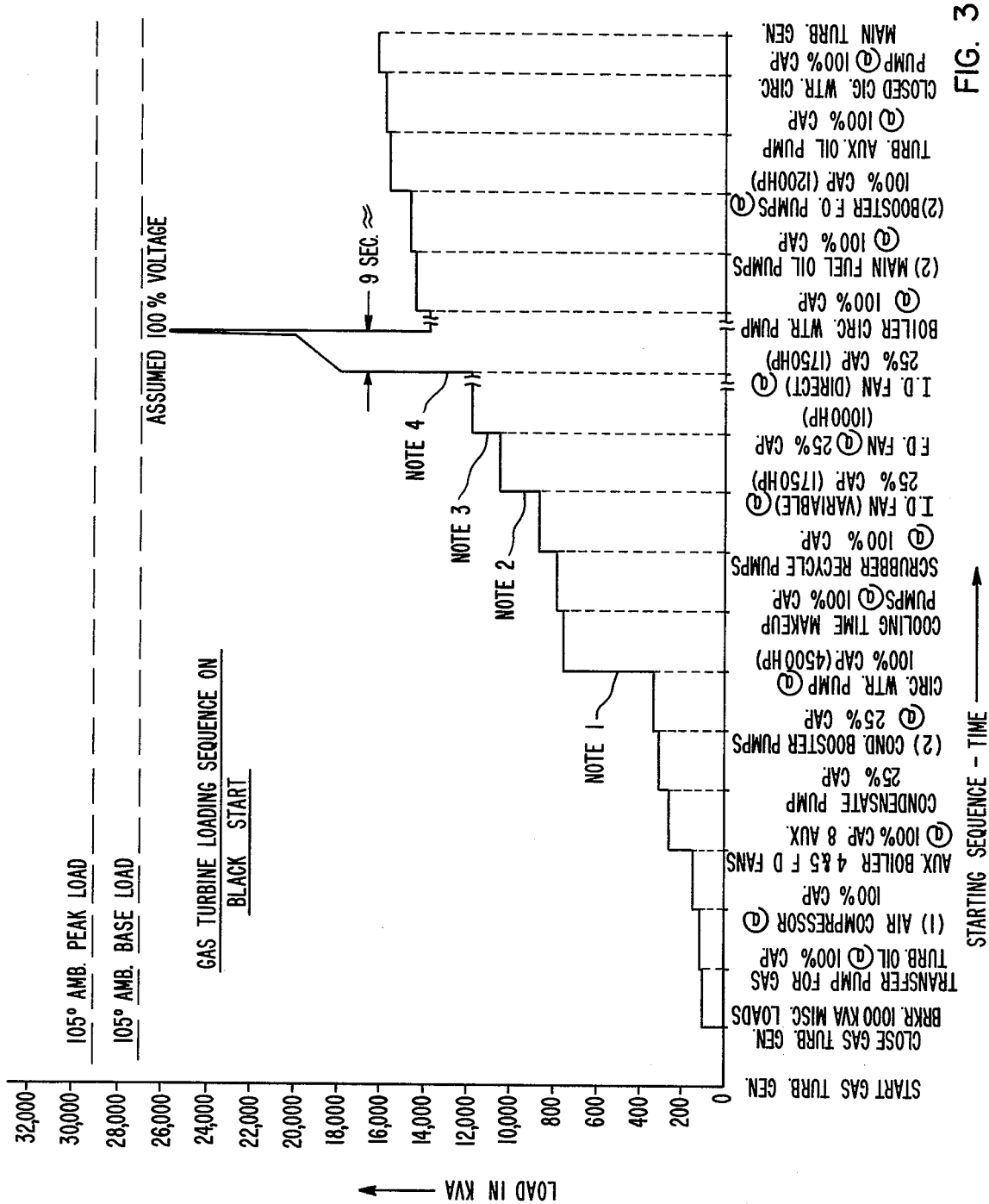

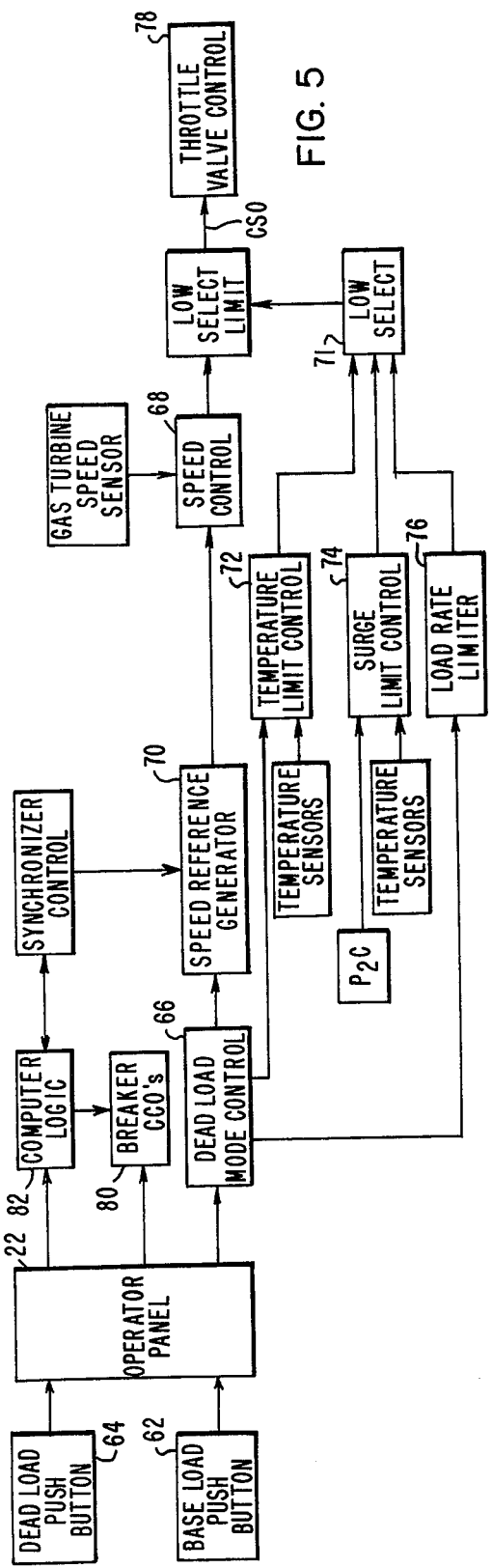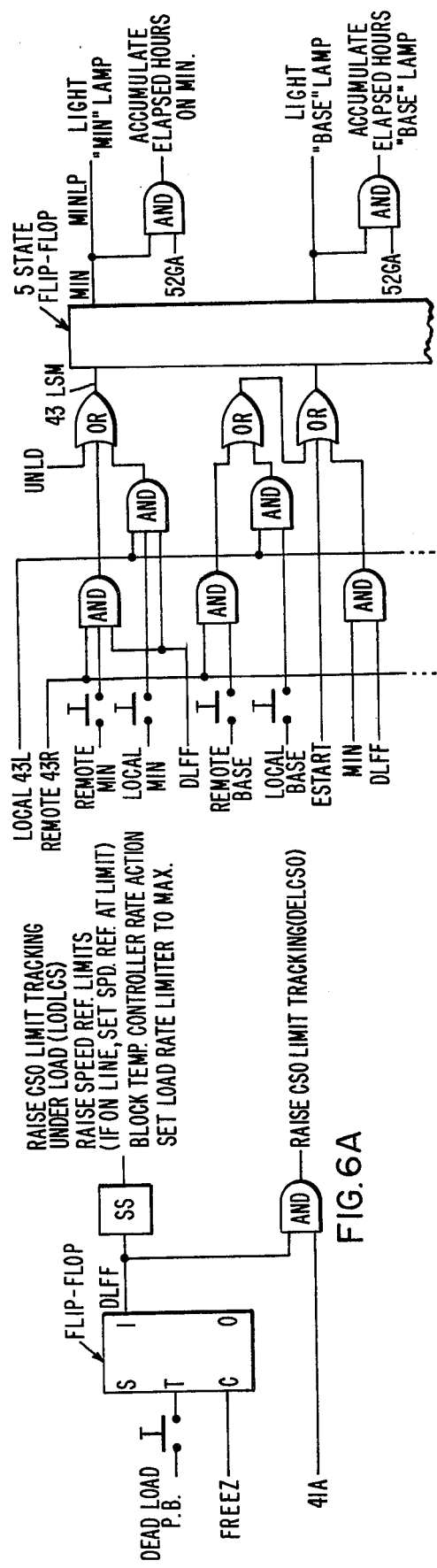

BLACK START SYSTEM FOR LARGE STEAM POWERED ELECTRIC GENERATION PLANTS

CROSS REFERENCE TO RELATED PATENT APPLICATIONS

Ser. No. 319,114 hereby incorporated by reference, entitled IMPROVED SYSTEM AND METHOD FOR OPERATING INDUSTRIAL GAS TURBINE APPARATUS AND GAS TURBINE ELECTRIC POWER PLANTS PREFERABLY WITH A DIGITAL COMPUTER CONTROL SYSTEM, filed by T. Giras et al. on Dec. 29, 1972 as a continuation of an earlier filed application, and directed to a gas turbine power plant having a basic control system usable in implementing the present invention.

BACKGROUND OF THE INVENTION

The present invention relates to electric power plants and more particularly to systems which employ gas turbines to make black starts for large fossil fired electric power plants.

A black fossil plant startup is one which is made when the plant has become isolated from the surrounding electric power system and thus must bootstrap itself into an operating state. The degree of difficulty in making a black start depends on the size of the plant and the power needed to drive all of the auxiliary equipment which must be operating before the plant can start generating electric power.

One way in which black plant starts can be achieved is through the use of a small boiler which when fired generates enough steam to drive steam operated auxiliary pumps and other equipment associated with a larger boiler. Once the larger boiler is started and supplies steam to a turbine-generator unit, electric power is generated for use in operating electric powered auxiliaries associated with other boilers located at the plant site.

Gas turbine-generator units have not been known to have been used commercially to make black plant starts for large fossil fired electric power plants, although the possibility of a black plant startup system employing a gas turbine generator has been considered from time to time. One of the principal difficulties in realizing a gas turbine black plant startup system has been the loading problems created by the larger plant auxiliary electric motors, such as 7000 HP forced draft or induced draft fan motors. Such motors and other electric auxiliaries create dead loading for a gas turbine during the fossil plant black startup and unless properly handled by the startup system can produce excessive stress damage to gas turbines rated at 30 MW or even higher.

Gas turbines have been operated for dead load pickup, for example as set forth in copending and coassigned patent application Ser. No. 703,737, entitled "System For Operating Multiple Gas Turbines For Coordinated Dead Load Pickup" filed by R. A. Yannone et al. on Apr. 9, 1976. However, that application and other known prior art have no direct bearing on the special problem of black steam plant starts.

SUMMARY OF THE INVENTION

A system is provided for black starting a large fossil fired electric power plant having a boiler and a steam turbine-generator and large electric motors and other smaller auxiliary loads which must be energized electrically before the steam turbine-generator can become operational. The system comprises a gas turbine-generator having a fuel system. Means are provided for operating a valve in the fuel system to control the gas turbine speed during and after startup to a predetermined limit speed higher than rated and higher than the normal limit speed. The fuel valve control is set in a black start mode in which a load rate limit is applied to the fuel valve operation only if an actual external load step exceeds a predetermined amount and the auxiliary plant loads are applied to the gas turbine-generator in accordance with a predetermined sequence after the gas turbine-generator has been started. The steam and gas turbine generators are connected to a common bus after the steam turbine-generator has been started.

BRIEF DESCRIPTION OF THE DRAWINGS

FIG. 3 shows a load sequence diagram indicating the load pickup operation of the gas turbine during a black plant start;

FIG. 5 shows a functional block diagram of a control system used in operating the gas turbine during a black plant start; and FIGS. 6A and 6B show black plant start logic employed in a digital computer.

DESCRIPTION OF THE PREFERRED EMBODIMENT

Figure 1:
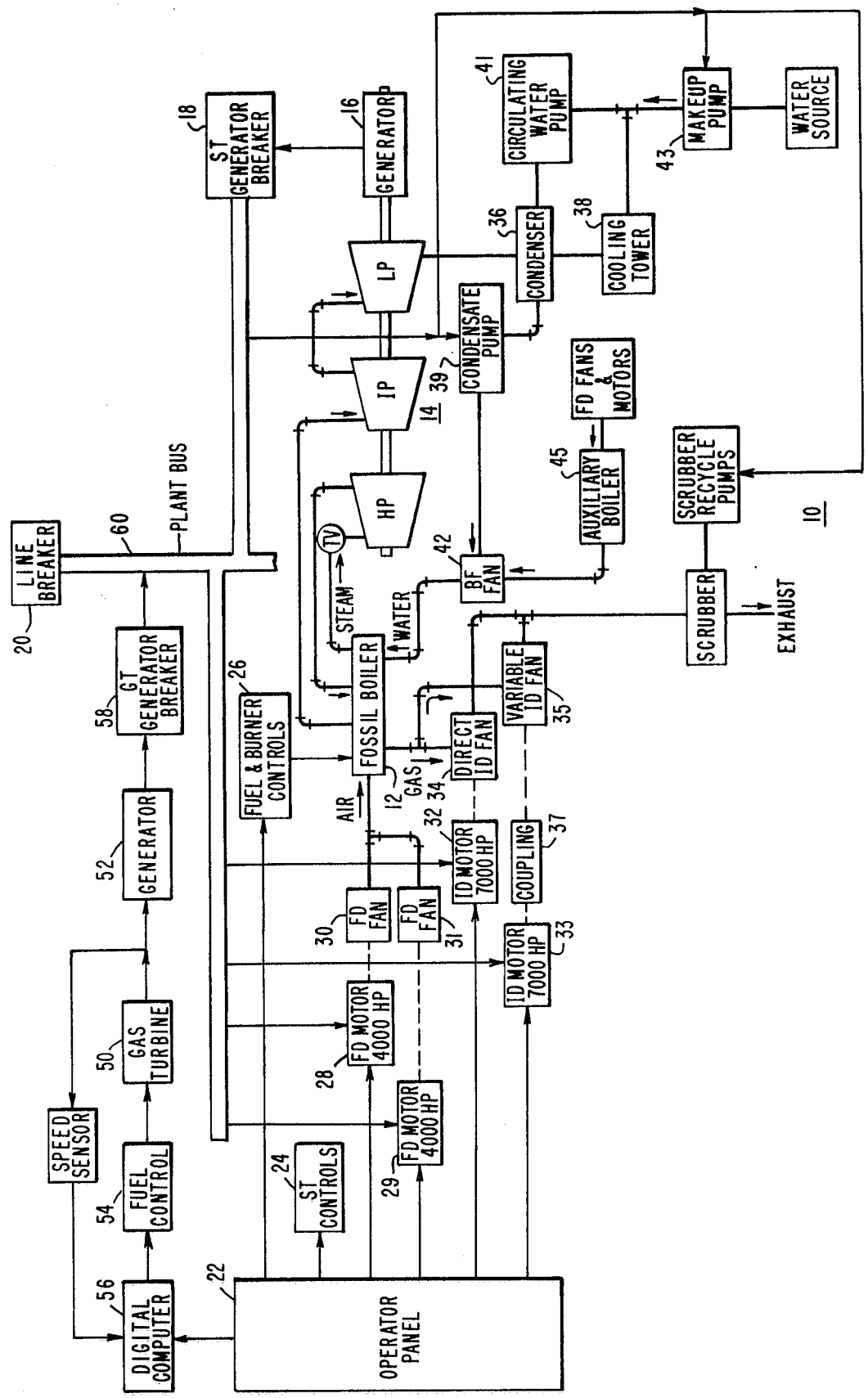
FIG. 1 shows a fossil fired electric power plant for which a black plant start is provided by a gas turbine in accordance with the principles of the invention.

More particularly, there is shown in FIG. 1 a large fossil fired electric power plant 10 having a boiler 12 which supplies steam to a steam turbine 14. A generator 16 is driven by the turbine 14 to provide electric power to the electric power system through a generator breaker 18 and a line breaker 20.

An operator panel 22 provides for operator control of the steam turbine 14 through controls 24 and the boiler 12 through fuel and burner controls 26 and through air and water flow controls (not specifically indicated). In this instance, a 4000 HP motor 28 is controlled to drive a forced draft fan 30, a 7000 HP motor 32 is controlled to drive directly an induced draft fan 34, and a 7000 HP motor 33 is controlled to drive an induced draft fan 35 variably through a hydraulic coupling 37. A second 4000 HP FD motor 29 drives an FD fan 31 normally after the steam turbine generator has been loaded and thus does not operate as a load on the gas turbine during black plant startup.

Return water from the turbine 14 is supplied from a condenser 36 by a condensate pump 39. A circulating water pump 41 circulates coolant from the condenser 36 to a cooling tower 38 and back. A coolant pump 43 provides makeup water to the circulatory loop.

A steam driven boiler feed pump 42 in this case supplies feedwater to the boiler 12. A small auxiliary boiler 45 supplies the drive steam to the boiler feed pump 42.

A gas turbine 50 and generator 52 provide for making a black plant start. A fuel control 54 operates the gas turbine 50 under the control of a digital computer 56 to start the gas turbine 50 and to operate the turbine 50 as black plant startup loading is applied to the generator 52. A breaker 58 couples the generator 52 to a plant bus 60 after the gas turbine has reached a predetermined speed such as 104% rated during a black plant start. Plant auxiliaries such as the FD motor 28 and the ID motor 32 obtain power from the bus 60 when they are switched to an on state by the operator at the operator's panel 22 or by the computer 56 or another plant digital computer (not shown).

Figure 2:
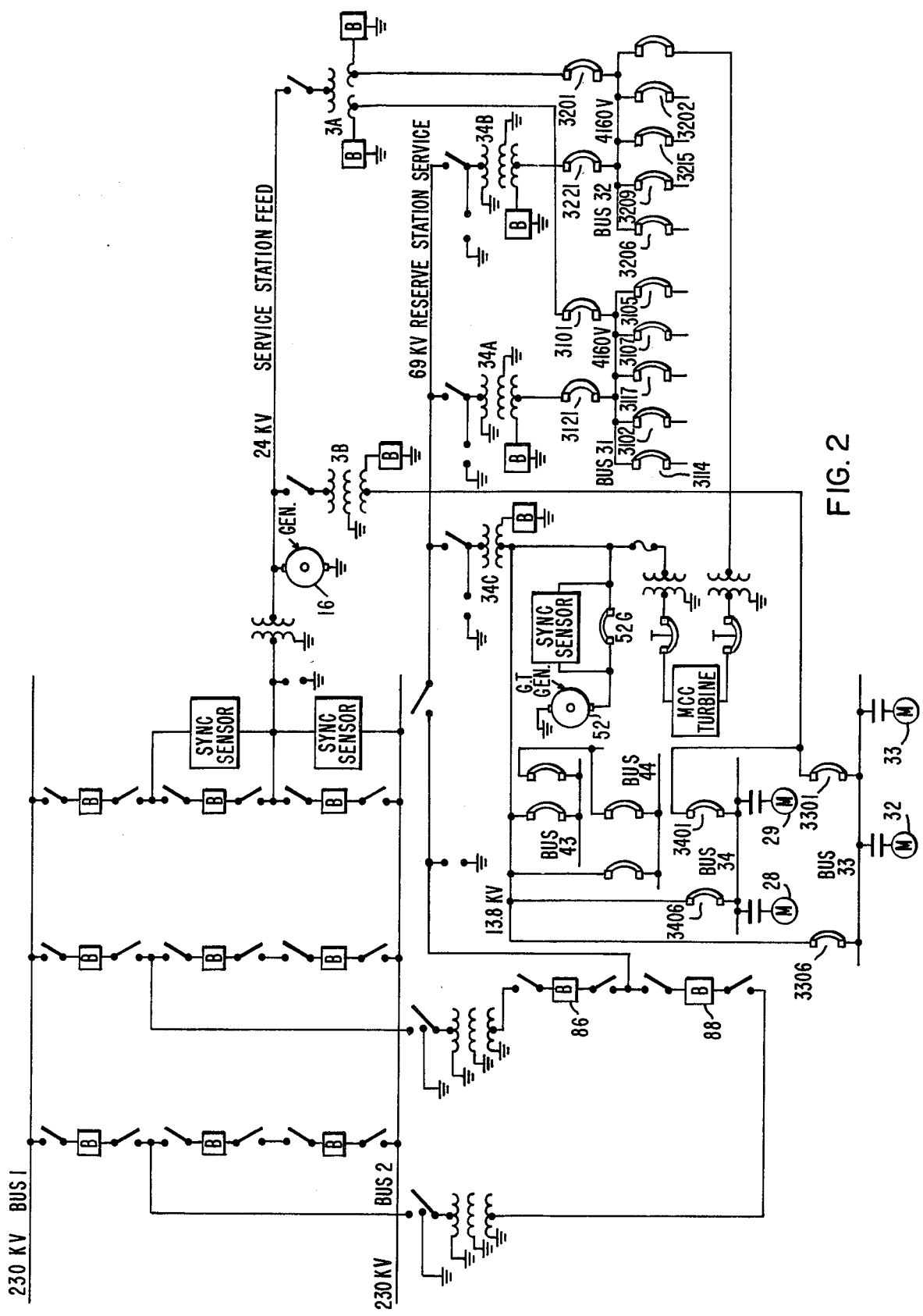
FIG. 2 shows an electric network diagram showing the principal auxiliary equipment items supplied by the gas turbine-generator during a black plant start.

The electrical connections for the principal plant auxiliaries energized during a black plant start are shown in FIG. 2. The sequence in which the auxiliaries are energized is shown in FIG. 3. Basically, the sequence is defined to place the equipment into operation in the order in which it is required to build up the plant operation to a generating status. The timing between load steps corresponding to the startup of the respective auxiliary equipment items is preferably varied in accordance with the size of the load steps. The larger load steps are followed by longer wait periods before the next load step is applied to provide optimized thermal warmup of the turbine hot parts. The application of each auxiliary load step is initiated by the operator from the panel 22 or under computer automatic timed control.

All large motors in this case are started manually by the plant operator. The motor characteristics including the starting current, full load current, and acceleration time at normal bus voltage may affect the minimum wait time between large motor starts depending upon the horsepower involved. It is also possible that two motors may be energized simultaneously where system studies indicate the turbine would not be overloaded. The main restriction on time between the starting of motors is that a second motor preferably should not be started until the thermal transients from a first motor start have settled out within the turbine structure. Time delays of 20 minutes or more can be experienced between requests for any two motors to be started in sequence depending on the external preparation involved in restart of the system. In addition to the four major fan and pump motors there are additional power requirements for smaller loads between each major motor start. These loads, although minor on an individual basis, are cumulative and amount to a substantial need.

Figure 4A:
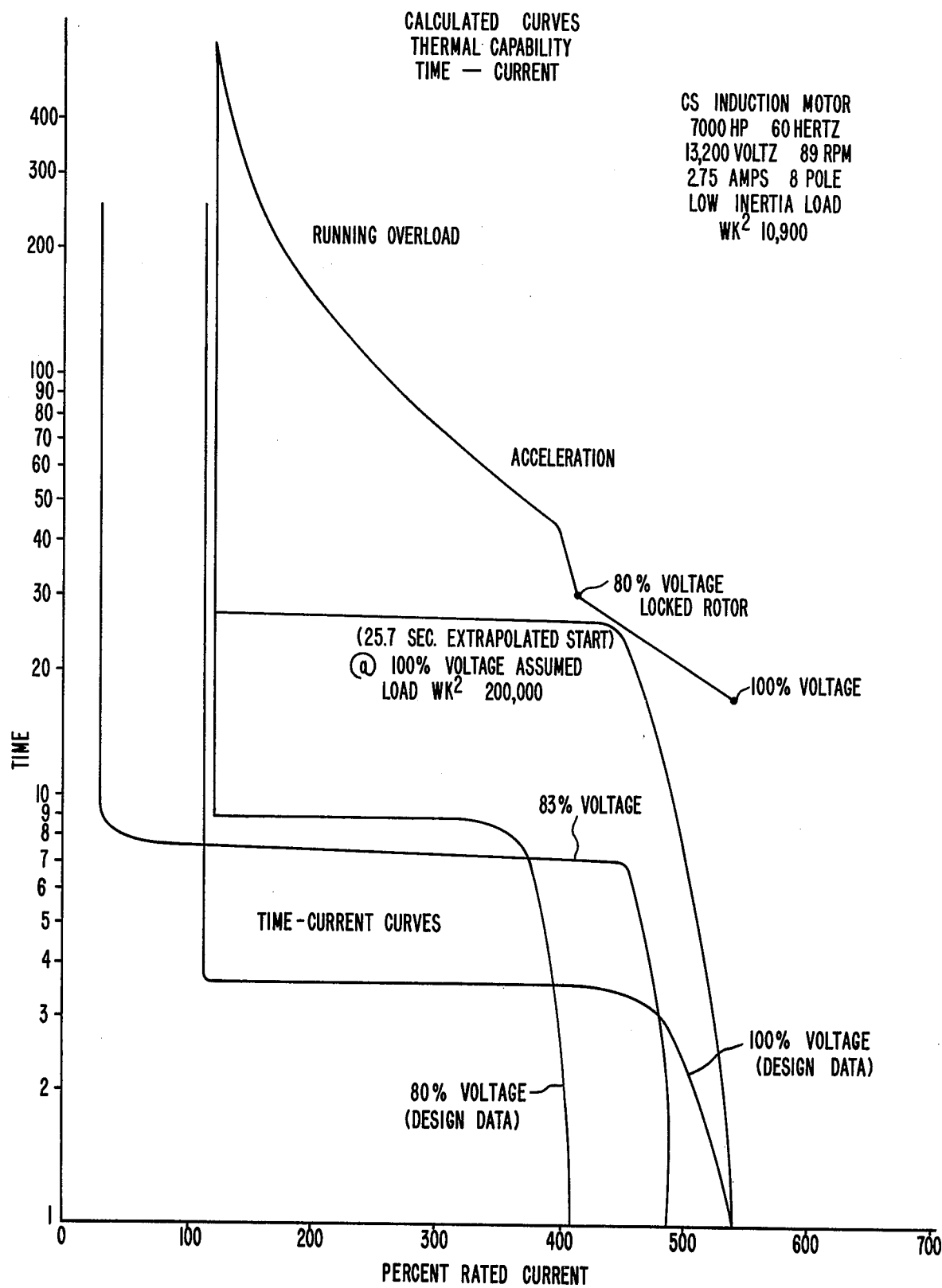
FIGS. 4A, 4B and 4C show curves indicating the startup characteristics load including load versus time of a 7000 HP motor.
Figure 4B:
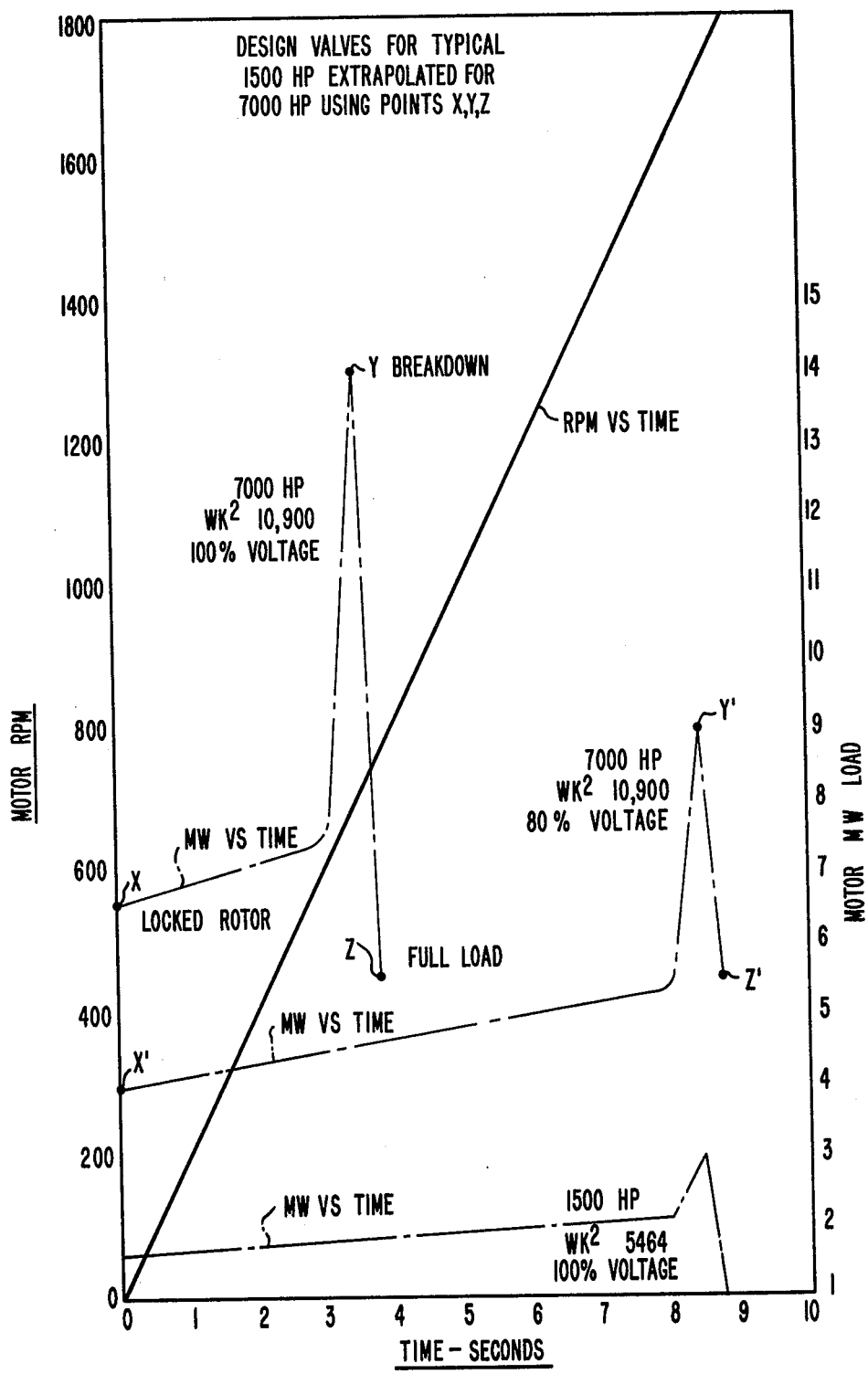
Figure 4C:
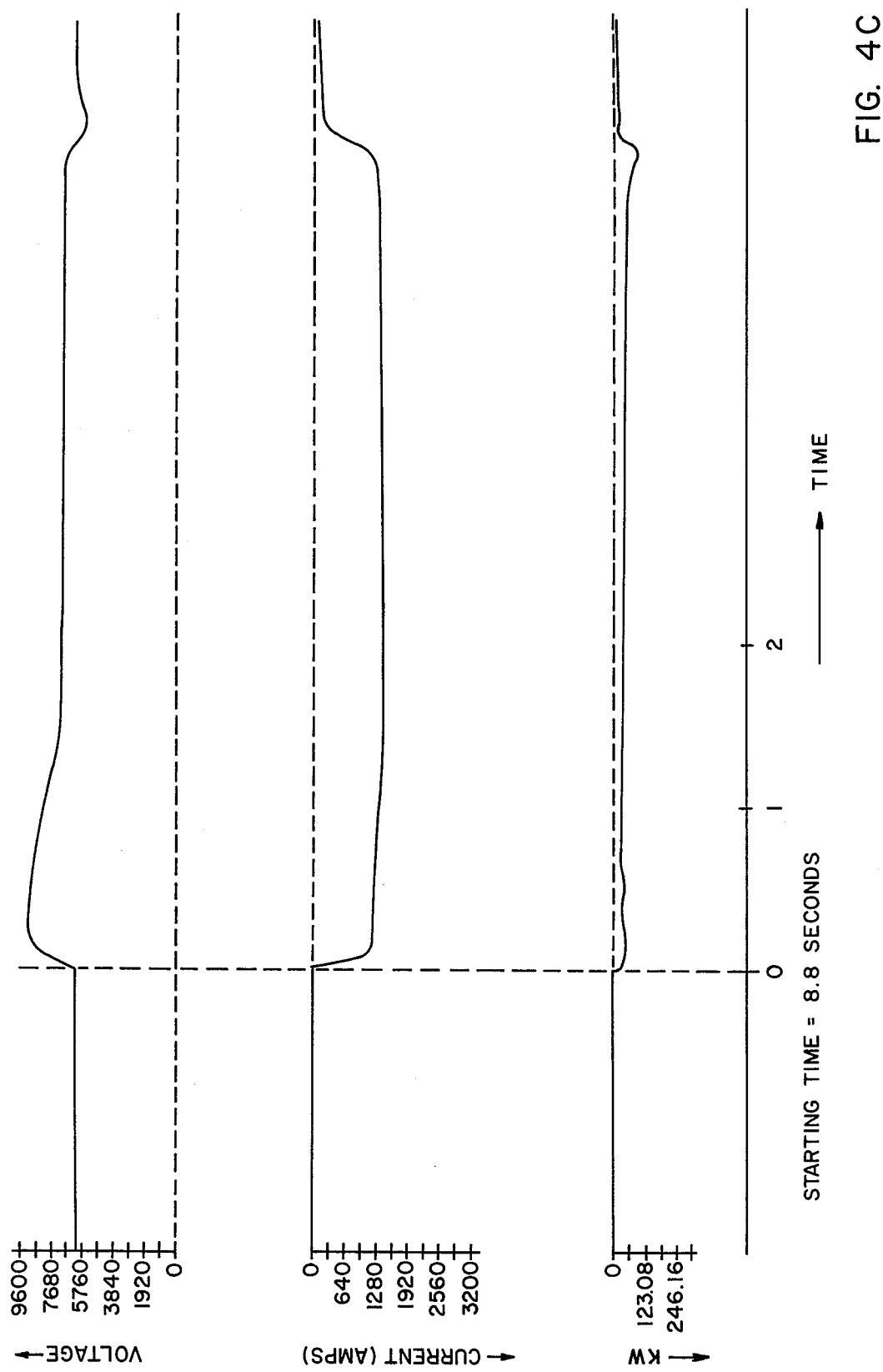

As observed in FIG. 3, the largest step loads are those provided by the FD and ID fan motors and the circulating water pump. In the case of the direct ID fan 34, the peak motor power requires a gas turbine fuel flow higher than the normal predetermined and precalculated fuel limit value. However, the duration of the spike is short enough that the rotor inertia (WR$^2$) is employed to ride through the spike with limited turbine fuel flow. FIGS. 4A and 4B show starting characteristics of the 7000 HP motors employed in the present embodiment.

The gas turbine control is shown in greater functional detail in FIG. 5. Some of the functions are provided by the computer 56 (FIG. 1) while other functions are provided by the fuel control 54. The gas turbine is started by pushing a base load start pushbutton 62. To pick up power plant auxiliaries load, a dead load pickup pushbutton 64 is depressed, and the turbine is accelerated and fired without turbine auxiliary motors. A dead load mode control 66 calibrates the gas turbine control for black plant starting operation, and a speed control 68 responds to the difference between an actual turbine speed signal and a speed reference from a speed reference generator 70. A low select 71 generates an output which is the lowest of outputs from a temperature limit control 72, a surge limit control 74 and a load rate limiter 76. In turn, a low select limit 73 generates a control signal output CSO which is the lowest of the speed error and the low selected limit. The load rate limit tracks the CSO since it changes with CSO as CSO goes up and down, i.e., the load rate limit as reflcted through the CSO limit will always ramp toward a new higher limit value which is a step value corresponding to 50% base load when an increase occurs in the CSO. As CSO decreases, the load rate limit is quickly tracked to a lower limit value corresponding to the lower CSO value.

The control signal output operates a throttle valve control 78 to raise the turbine speed to above 104% rated speed at the end of the startup period.

During a normal turbine start, the speed reference generator 70 generates a progressively increasing speed reference which causes the turbine to accelerate to the 104% target speed in about 10 minutes. Temperature or surge limit action can lengthen the startup time to provide turbine protection against excessive blade or exhaust path temperature or surge conditions.

At the 104% target speed, the gas turbine generator breaker 526 (FIG. 2) is closed to energize the gas turbine motor control center, as by generation of a CCO from block 80 under control of computer logic 82. The 4.16 KV and 13.8 KV bus sections (FIG. 2) are accordingly energized. Next, various 480V load centers are energized by breaker closures as follows:

| Load Center | Breaker No. |
|---|---|
| 309 Fuel Oil Tank Farm | 3114 |
| 303 Gen. Sta. Service | 3117 |
| 403 Gen. Sta. Service | 3203 |
| 304 Gen. Sta. Service | 3215 |
| 404 Gen. Sta. Service | 3116 |
| 305 F.O. and Scrubber | 3105 |
| 306 F.O. and Scrubber | 3206 |
| 307 Boiler | 3107 |
| 308 Boiler | 3209 |
| 301 Turbine | 3102 |
| 302 Turbine | 3202 |

With service air, lubrication oil pumps available, the startup procedure can be begun for the large fan motors and other plant loads in accordance with the black start load sequence. Fan motors 28, 29, 32 and 33 are in this case started by closure of relay contacts (FIG. 2) operated from the panel 22. Within about 8 hours, the startup procedure is completed by synchronizing the gas turbine generator 52 with the steam turbine generator 16 by operation of a synchronizer control 83 (FIG. 5) or simply by use of a conventional synchroacceptor. Breakers 86 and 88 are closed to synch the generators 16 and 52 to each other, and subsequently the entire plant 10 can be synched to the external power system.

As loads are applied to the turbine in steps in accordance with the sequence start of FIG. 3, the turbine continues to operate under speed control but the speed droops toward rated speed as more load is applied under the control of the speed droop control.

As shown in the program listing in Appendix pages A1-A4, the computer 56 is programmed to provide dead load or black steam plant start calibration for the gas turbine control on selection of dead load mode. This action corresponds to the dead load mode control operation shown in FIG. 2. Thus, a dead-load flip-flop is set as shown in logic FIG. 6A, and as a result: (1) temperatue controller rate action is blocked because large load steps to be absorbed during the black plant start would otherwise cause an underspeed trip as a result of speed droop stemming from normal temperature limit action against rapidly rising blade path temperature during a large load step; (2) the load rate limiter in this case is set to 50% of base load, which is safer than simply allowing full base load as a limit, i.e. any load step in excess of this is limited in rate at which it can be picked up; in other applications, the load rate limiter can be set to other suitable values or it can be made variable automatically in response to the particular load step in the black start sequence; in that case, the load step selected manually or automatically triggers the setting of a load rate limit based on the size of that particular step for the time period during which that load step is being picked up; some enhancement in turbine protection is provided by this technique; (3) the maximum speed under load is raised to allow the turbine to go to a higher than rated speed (i.e., 104% rated herein) which with a 4% speed droop allows for the expected plant load pickup to 100% capability; (4) the minimum load pushbutton is blocked since base load limit is required for the size load to be picked up on the black plant start; and (5) the CSO limit (or speed/load limit) tracking is changed to permit a higher fixed fuel limit or to permit adjustable or programmable fuel limits to correspond to the load step requirement. The load rate limit ramps up to a value which allows a step change in CSO slightly larger than the expected change in load necessary to sustain the next load step; in this case the same change is provided for the CSO limit for all load steps, i.e. to allow a step of 50% of base load as previously considered. Therefore, the fuel or CSO limit is used in a unique way. It is also possible to allow a limited reduction in motor supply voltage during a black plant start to reduce the size of KW load steps on the turbine, but the motor startup time is thereby increased. Excessive reduction in supply voltage will prevent motor acceleration and therefore the possible reduction in power through voltage reduction is limited.

With the described startup system, improved black plant starts are realized through more facilitated and better managed procedures while turbine protection is maintained. The following notes apply to FIG. 3.

| NOTE 1 - START CIRC. WTR. PUMP | |
|---|---|
| Rated HP = | 4500 |
| 100% loading after start | |
| F.L. Amps = | 189 |
| Starting Amps = | 1100 |
| Accn. Time at 100% volts = | 3.8 sec. |
| Accn. Time at 80% volts = | 9 sec. |
| NOTE 2 - START I.E. FAN (VAR) | |
| Rated HP = | 7000 |
| 25% loading after start | |
| 1/4 F.L. Amps = | 80 (Approx.) |
| Starting Amps = | 1410 |
| Accn. Time at 100% volts = | 5 secs. |
| Accn. Time at 80% volts = | 8.3 secs. |
| NOTE 3 - START F.D. FAN | |
| Rated HP = | 4000 |
| 25% loading after start | |
| 1/4 F.L. Amps = | 50 (Approx.) |
| Starting Amps = | 966 |
| Accn. Time at 100% volts = | 17.1 secs. |
| Accn. Time at 80% volts = | 31.5 secs. |
| NOTE 4 - START I.D. FAN (DIRECT) | |
| Rated HP = | 7000 |
| 25% loading after start | |
| 1/4 F.L. Amps = | 80 (Approx.) |
| Starting Amps = | 1350 |
| Accn. Time at 100% volts = | 25.7 secs. |
| Accn. Time at 80% volts = | 42.18 secs. |

Pages which follow disclose computer program steps employed in embodying the invention.

APPENDIX A

```
                    GT251B2 PEPCO DEAD LOAD PICKUP              1642843
 1
 2
 3                  USE PUSHBUTTON TO RIGHT OF LMC-P50 TRANSFER BUTTON TO
 4                  SELECT DEAD LOAD CALIBRATION. THIS BUTTON, PB61,IS
 5                  ONE OF 2 MADE AVAILABLE IN THE LMC PROGRAM, WHICH USES PB45
 6
 7          34745           BORG 34745
10  34745   33447           OCT  33447           OCT  PB61-1
11
12          33450           BORG 33450
13  33450   16122           OCT  16122    PB61   RSH  DLFF      ALTERNATE ACTION P.B. PROGRAM
14  33451   27053           OCT  27053           PJP  L+3
15  33452   36077           OCT  36077           RJP  CANCDL    NORMAL CALIBRATION
16  33453   24575           OCT  24575           JMP  EXITF
17  33454   36056           OCT  36056           RJP  DLP       DEAD LOAD CALIBRATION
20  33455   24575           OCT  24575           JMP  EXITF
21
22  33456   00000           OCT  0        DLP    ...
23  33457   03122           OCT  03122           SMB  DLFF      SET DEAD LOAD FLIPFLOP
24  33460   32123           OCT  32123           ENL  DLPDEL    CHANGE SPD/LD LIMIT TRACKING
25  33461   37574           OCT  37574           STL  LDDLCS    VALUE USED UNDER LOAD
26  33462   32125           OCT  32125           ENL  DMXSPD    RAISE MAX SPEED UNDER LOAD
27  33463   37573           OCT  37573           BSTL 31277
30  33464   10172           OCT  10172           ADD  10)
31  33465   37571           OCT  37571           BSTL 31305
32  33466   37570           OCT  37570           STL  M4LIMT
33  33467   32175           OCT  32175           ENL  EXITF-1)  BLOCK MIN LOAD PUSH BUTTON
34  33470   37567           OCT  37567           BSTL 34673
35  33471   32127           OCT  32127           ENL  JMP1      SET LOAD RATE LIMITER TO MAX
36  33472   24072           OCT  24072           JMP  L+1       (PROVISIONS ONLY)
37  33473   32165           OCT  32165           ENL  0)
40  33474   37564           OCT  37564           STL  BPGNK2    BLOCK TEMPERATURE CONTROLLER
41  33475   37563           OCT  37563           STL  EXGNK2    RATE ACTION.
42  33476   24175           OCT  24175           JMP  DLP1
43
44  33477   00000           OCT  0        CANCDL ...
45  33500   02122           OCT  02122           CMB  DLFF      CLEAR DEAD LOAD FLIPFLOP
46  33501   32124           OCT  32124           ENL  SVDLCS    RESTORE CSOLIM TRACKING
47  33502   37562           OCT  37562           STL  DELCSO
50  33503   32126           OCT  32126           ENL  NMXSPD    RESTORE TOP LIMIT ON SPEED
51  33504   37573           OCT  37573           BSTL 31277    DURING LOADING
52  33505   10172           OCT  10172           BADD 10)
```

```
53  33506  37571          OCT 37571           BSTL 3130.
54  33507  32161          OCT 32161           BENL PB07=1) RESTORE USE OF MIN PUSHBUTTON
55  33510  37567          OCT 37567           BSTL 34673
56  33511  32130          OCT 32130           ENL PJP1   RESTORE LOAD RATE LIMITER
57  33512  37566          OCT 37566           BSTL 32674
60  33513  32160          OCT 32160           BENL 235)  RESTORE SPD/LD LIMIT TRACKING
61  33514  37574          OCT 37574           BSTL LDDLCS  VALUE USED UNDER LOAD.
62  33515  32157          OCT 32157           BENL 40)
63  33516  37564          OCT 37564           STL BPGNK2  RESTORE TEMPERATURE
64  33517  32156          OCT 32156           BENL 140)    CONTROLLER RATE ACTION
65  33520  37563          OCT 37563           STL EXGNK2
66  33521  24200          OCT 24200           JMP CNCDL1
67
70
71  33522  00000          OCT 0       DLFF   OCT
72  33523  00543          OCT 543     DLPDEL OCT 543   DEAD LOAD DELCSO 1V  ADC/2
73  33524  00140          OCT 140     SVDLCS OCT 140   NORMAL DELCSO 0.2V  ADC/2
74  33525  12221          OCT 12221   DMXSPD OCT 12221  5265 RPM SPEED REF MAX.=DD LD
75  33526  12101          OCT 12101   NMXSPD OCT 12101  5185 RPM SPEED REF MAX.=NORM
76  33527  24274          OCT 24274   JMP1   OCT 24274  JMP L+1 DEAD LOAD
77  33530  27276          OCT 27276   PJP1   OCT 27276  PJP RAMPIT = NORMAL
100
101                           THE FOLLOWING PROGRAM RUNS AS PART OF THE SEQUENCE PROGRAM
102
103 33531  32122          OCT 32122   DLPRR   ENL DLFF   EVALUATE DEAD LOAD LAMP CCO
104 33532  37555          OCT 37555           STL DDLLP
105 33533  27554          OCT 27554           PJP BD26JP RETURN IF NOT IN DEAD LOAD CAL
106 33534  32553          OCT 32553           ENL 41A    OTHERWISE, INCREASE CSOLIM
107 33535  27137          OCT 27137           PJP L+3    TRACKING IF FLD BKR IS CLOSED
110 33536  32123          OCT 32123           ENL DLPDEL
111 33537  37562          OCT 37562           STL DELCSO
112 33540  16552          OCT 16552           RSH MIN    ALSO, CHANGE TO BASE IF MIN
113 33541  27143          OCT 27143           PJP L+3    LOAD IS SELECTED
114 33542  02552          OCT 02552           CMB MIN
115 33543  03551          OCT 03551           SMB BASE
116 33544  16550          OCT 16550           RSH FREEZ  CANCEL DEAD LOAD CALIBRATION
117 33545  27146          OCT 27146           PJP L+2    ON SHUTDOWN.
120 33546  36077          OCT 36077           RJP CANCDL
121 33547  24554          OCT 24554           JMP BD26JP RETURN TO SEQUENCE PROGRAM
122
123 33550  11151          OCT 11151           WRD FREEZ
124 33551  11122          OCT 11122           WRD BASE
125 33552  11121          OCT 11121           WRD MIN
126 33553  11441          OCT 11441           WRD 41A
127 33554  12335          OCT 12335           WRD BD26JP=1
130 33555  11537          OCT 11537           WRD DDLLP
131 33556  00140          OCT 140             WRD 140)
132 33557  00040          OCT 40              WRD 40)
133 33560  00235          OCT 235             WRD 235)
134 33561  35515          OCT 35515           WRD PB07=1)
135 33562  33271          OCT 33271           WRD DELCSO
136 33563  33264          OCT 33264           WRD EXGNK2
137 33564  33260          OCT 33260           WRD BPGNK2
140 33565  00000          OCT 0               WRD 0)
141 33566  32674          OCT 32674           WRD 32674
142 33567  34673          OCT 34673           WRD 34673
143 33570  33254          OCT 33254           WRD M4LIMT
144 33571  31305          OCT 31305           WRD 31305
145 33572  00010          OCT 10              WRD 10)
146 33573  31277          OCT 31277           WRD 31277
147 33574  23427          OCT 23427           WRD LDDLCS
150 33575  34777          OCT 34777           WRD EXITF=1
151
152        33576          BORG 33576
153 33576  32204          OCT 32204   DLP1    ENL INS1   INITIALIZE KWREF FOR DEAD LD
154 33577  37606          OCT 37606           BSTL 31147
155 33600  24456          OCT 24456           JMP DLP,I
156 33601  32205          OCT 32205   CNCDL1  ENL INS2   RESTORE KW CONTROLLER
157 33602  37606          OCT 37606           BSTL 31147
160 33603  24477          OCT 24477           JMP CANCDL,I
161 33604  32301          OCT 32301   INS1    ENL TOPKW
162 33605  32707          OCT 32707   INS2    ENL MINKW
163 33606  31147          OCT 31147           WRD 31147
164
165                              FREE TO 33717
166
167        12256          BORG 12256          ADD LAMP CCO BIT TO SEQ. CCO MASK
170 12256  23767          OCT 23767
171
172        10512          BORG 10512          ADD LAMP CCO TO LAMP TEST MASK
173 10512  33767          OCT 33767
174
175        22125          BORG 22125          SKIP GLIDE ON BLACK PLANT START
176 22125  11242          OCT 11242                   OCT 27BUSD
177
200                              GO FROM SEQUENCE PROGRAM TO DEAD LOAD LOGIC
201        12777          BORG 12777
202 12777  33530          OCT 33530                   OCT DLPRR=1
203
```

```
204                                         CHANGE METHOD OF DETERMINING IF TURBINE IS ON SPEED CONTROL
205             07270         8ORG 7270     ONSPD EQUALS TOLNC + CSOLIM - CSO
206    07270    24270         OCT 24270                  JMP L+1
207             07275         8ORG 7275
210    07275    37617         OCT 37617     TOLNC        OCT -160
211             07373         8ORG 7373
212    07373    24723         OCT 24723                  OCT CSO
213
214             00000         END
```

What is claimed is:

1. A system for black starting a large fossil fired electric power plant having a boiler and a steam turbine-generator and large electric motors and other smallar auxiliary loads which must be energized electrically before the steam turbine-generator can become operational, said system comprising a gas turbine-generator having a fuel system with a fuel valve, means for operating said fuel valve to control the gas turbine speed during and after startup to a predetermined limit speed higher than rated and higher than the normal limit speed, means for setting said fuel valve control in a black start mode in which a load rate limit is applied to the fuel valve operation only if an actual load step exceeds a predetermined limit amount, means for applying the auxiliary plant loads to said gas turbine-generator in accordance with a predetermined sequence after the latter has been started, and means for connecting the steam and gas turbine generators to a common bus after the steam turbine-generator has been started.

2. A system as set forth in claim 1 wherein the predetermined load limit ia adjustable to the allowed load pickup limits of said gas turbine.

3. A system as set forth in claim 2 wherein the predetermined load step limit differs for successive load steps in accordance with the expected size of the actual load steps.

4. A system as set forth in claim 1 wherein a temperature limit control is coupled to said throttle valve control, and said mode setting means further includes means for inhibiting temperature rate control action normally included as a part of said temperature limit control.

5. A system as set forth in claim 1 wherein a CSO limit is normally applied to said throttle valve control and the control signal output limit is raised by said mode setting means to permit step load increases to be applied to the turbine.

6. A system as set forth in claim 1 wherein the large electric motors include at least two fan motors of which at least one provides a startup load in excess of the load rate limit operative during the black plant start.

7. A system as set forth in claim 1 wherein means are provided for tracking of the load step to allow reset of the fuel limit for each step and track ahead for the subsequent step.

* * * * *